Jan. 1, 1929.
J. M. MOYER ET AL
WEEDING KNIFE
1,697,016
Filed Sept. 29, 1927
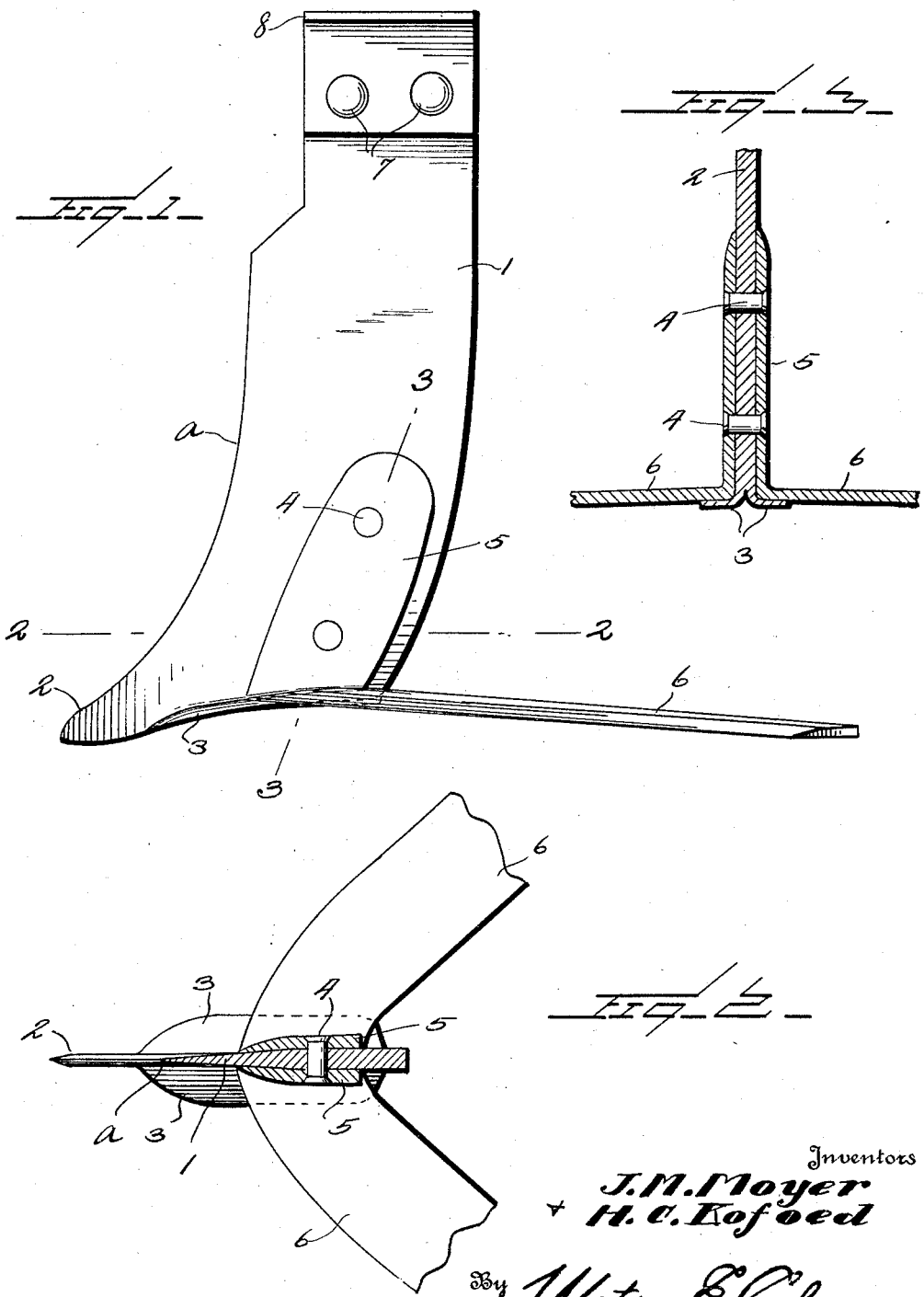

Patented Jan. 1, 1929.

1,697,016

UNITED STATES PATENT OFFICE.

JAMES M. MOYER AND HANS C. KOFOED, OF YUMA, COLORADO.

WEEDING KNIFE.

Application filed September 29, 1927. Serial No. 222,868.

This invention relates to weeding knives and an object of the invention is to provide a device of this kind particularly designed for use in connection with a cultivator of the type disclosed in our pending application Serial No. 163,450 filed January 25, 1927.

It is an object of the invention to provide a knife of this kind wherein is eliminated the liability of weeds becoming caught thereon.

It is also an object of the invention to provide a knife of this kind embodying a vertically disposed cutting shank having wing blades associated therewith and wherein the shank is provided with a point extending below the blades to penetrate hard or crusted soil and to raise trash and other foreign matter to the surface.

The invention consists in the details of construction and in the combination and arrangement of the several parts of our improved weeding knife whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawing, wherein:—

Figure 1 is a view in side elevation of a knife constructed in accordance with an embodiment of our invention;

Figure 2 is a sectional view taken substantially on the line 2—2 of Figure 1, the wing blades being shown in fragment;

Figure 3 is a fragmentary sectional view taken substantially on the line 3—3 of Figure 1.

As herein disclosed, our improved knife comprises an upstanding shank 1 having its forward vertical marginal portion formed into a cutting edge $a$. This cutting edge $a$ is disposed forwardly and downwardly on a predetermined outward curvature with the lower forward portion of the shank 1 continued by an extension or point 2, the cutting edge $a$ of the shank being continued along this point or extension 2. The lower portion of the shank 1 rearwardly of the extension or point 2 is provided with the oppositely disposed laterally directed webs or flanges 3 integral with the shank 1 and which are provided by first splitting the lower portion of the shank 1 and then properly bending the metal so separated.

To each side face of the shank 1 is riveted, as at 4, or otherwise attached an upstanding arm 5 carried by the inner end portion of a wing blade 6. The inner portions of the blades 6 have close contact with the rear portions of the webs or flanges 3 and the portions of the webs or flanges 3 in advance of the blades 6 extend forwardly on a downward incline providing means coacting with the point or extension 2 to raise trash or other foreign matter to the surface and to prevent such trash and the like from becoming caught or stuck in the corners of the knife.

The point or extension 2 together with the shank 1 assures an effective penetration into hard or crusted soil.

The upper end portion of the shank 1 has connected with each side thereof by the rivets 7 or the like a bracket plate 8 providing means whereby our improved knife may be properly engaged with a frame such as disclosed in our pending application hereinbefore referred to.

From the foregoing description it is thought to be obvious that a weeding knife constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

1. A knife of the class described comprising an upstanding shank having its forward vertical margin formed into a cutting edge, the lower portion of the shank being split, the separated material being directed outwardly to provide the lower portion of the shank with oppositely disposed flanges, the lower forward portion of the shank being continued by a penetrating point disposed in advance of the flanges, and wing blades secured to the opposite faces of the shank and resting upon the rear portions of the flanges.

2. A knife of the class described comprising an upstanding shank having its forward vertical margin formed into a cutting edge, the lower portion of the shank being split, the separated material being directed outwardly to provide the lower portion of the shank with oppositely disposed flanges, the lower forward portion of the shank being continued by a penetrating point disposed in advance of the flanges, and wing blades secured to the opposite faces of the shank and resting upon the rear portions of the flanges, the portions of the flanges in advance of the blades being disposed on an upward curvature.

In testimony whereof we hereunto affix our signatures.

JAMES M. MOYER.
HANS C. KOFOED.